Patented Dec. 21, 1948

2,456,670

UNITED STATES PATENT OFFICE 2,456,670

CELLULOSE COMPOUND WRINKLE COMPOSITION

Nathan T. Beynon, Dayton, Ohio, assignor to New Wrinkle, Inc., Wilmington, Del., a corporation of Delaware No Drawing. Application August 13, 1945, Serial No. 610,675

10 Claims. (Cl. 106—171)

This invention relates to coating composition, and more particularly deals with coating compositions adapted to dry to a wrinkle.

Hitherto wrinkle drying coating compositions have been of two types; varnish type and alkyd type.

Varnish type wrinkle drying coating compositions consist essentially of a varnish base including a wrinkling oil in admixture with drier and solvent; while alkyd base wrinkle drying coating compositions consist essentially of an alkyd resin in admixture with drier and a solvent.

The production of both varnish base and alkyd base wrinkle drying coating compositions requires the use of cooking facilities. The purpose of the present invention is to produce a new type of wrinkle drying coating composition wherein the cooking step is completely dispensed with. In other words, the coating compositions which are the subject matter of the present invention are prepared by compounding the component parts thereof without the necessity of cooking.

According to the present invention a wrinkling oil (that is to say, an oil which includes conjugated double bonds in its chemical structure) is admixed with a solution of a cellulosic material such as cellulose acetate in a ratio of from 10 parts to 50 parts of cellulose acetate to 100 parts of wrinkling oil.

To the resulting mixture may be added, if so desired, from 40 to 80% of a pigment paste comprising for example, two-thirds pigment and one-third wrinkling oil by weight. This pigment paste is thoroughly blended into the mixture of cellulose derivative and wrinkling oil to produce a homogeneous composition.

To this homogeneous composition is added a quantity of solvent such as naphtha, toluol, xylol, or mixtures thereof, or any other solvent such as customarily employed in varnish formulations, in quantity sufficient to produce a coating of the desired viscosity.

For example, a coating of suitable viscosity for application by spreading may consist of 40 parts by weight of cellulose acetate, 100 parts by weight of wrinkling oil, 60 parts by weight of pigment paste, and 10 parts by weight of naptha.

The use of cellulose derivatives in admixture with wrinkling oils for producing wrinkle drying coating composition is new in the art; in fact, it has been hitherto considered impossible to use cellulose acetate and the like in wrinkle drying coating compositions of any sort because the cellulose derivative acted as an inhibitor of wrinkle formation.

The texture of the wrinkle pattern obtained according to the present invention may be controlled or altered by selection of the type of cellulose derivative used. In addition, wrinkle patterns or textures hitherto unobtainable may be produced varying in the amount of cellulose derivative employed in the formulation. In addition, this new type of wrinkle drying coating composition including cellulose acetate or the like responds to temperature variation during the initial drying or texturing period to such an extent that great variety of textures or patterns may be obtained.

It is believed that the underlying theory governing the production of wrinkle drying coating composition including cellulose acetate and the like is as follows:

The mixture of cellulose derivative and wrinkling oil consists of two components which are compatible with each other; however, during the drying or film-forming period these ingredients separate into distinct phases, and thereby the texture of the wrinkle pattern is altered depending on the relative proportion or ratio of the two component parts. It will be understood, of course, that this theory is offered merely in explanation of observed facts, and that it is not intended thereby to limit this invention.

The following cellulose derivatives have been used sucessfully in the practice of this invention:

Cellulose acetate—37–39 acetyl value
Cellulose acetate—43–45 acetyl value
Ethyl cellulose
Nitrocellulose Any of these cellulose derivatives may be employed successfully in ratios of from 10 parts to 50 parts thereof to each 100 parts of wrinkling oil, and has been so employed in the practice of this invention.

As has been noted hereinbefore, wrinking oils are oils which include conjugated double bonds in their chemical structure. They may be native oils such as tung oil and oiticica oil, or they may be modified oils such as dehydrated castor oil (either blown or unblown), blown linseed oil and alkali isomerized oils prepared from normally non-drying oils such as peanut oil and cottonseed oil, or they may be any other type of fatty oil which includes conjugated double bonds in its chemical structure either in the native state or after treatment causing conjugation of isolated double bonds.

Wrinkle drying coating compositions made according to the method of this invention have been successfully applied on paper, fabric, and other similar flexible materials with great success. The composition has been applied by spraying, spreading, and rolling, and the resulting film has been dried at a 130° F. for an initial period of 30 minutes and thereafter for an additional period of from 30 to 60 minutes at 180° F.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. As a new composition of matter, a wrinkle drying coating composition consisting of a conjugated double-bonded fatty oil and a cellulose compound selected from the group consisting of cellulose acetate, ethyl cellulose, and nitrocellulose cold-mixed in proportions of 100 parts by weight of said oil to from 10 to 50 parts by weight of the cellulose compound.

2. As a new composition of matter, a wrinkle drying coating composition consisting of a conjugated double-bonded fatty oil and cellulose acetate cold-mixed in proportions of 100 parts by weight of said oil to from 10 to 50 parts by weight of cellulose acetate.

3. As a new composition of matter, a wrinkle drying coating composition consisting of a conjugated double-bonded fatty oil and ethyl cellulose cold-mixed in proportions of 100 parts by weight of said oil to from 10 to 50 parts by weight of ethyl cellulose.

4. As a new composition of matter, a wrinkle drying coating composition consisting of a conjugated double-bonded fatty oil and nitrocellulose cold-mixed in proportions of 100 parts by weight of said oil to from 10 to 50 parts by weight of nitrocellulose.

5. As a new composition of matter, a wrinkle drying coating composition consisting of a conjugated double-bonded fatty oil and cellulose acetate having an acetyl value of 43-45 cold-mixed in proportions of 100 parts by weight of said oil to from 10 to 50 parts by weight of cellulose acetate.

6. The method of making a wrinkle drying coating composition which consists of admixing at room temperature a conjugated double-bonded fatty oil with a cellulose compound selected from the group consisting of cellulose acetate, ethyl cellulose and nitrocellulose in proportions of from 10 to 50 parts by weight of cellulose compound to 100 parts by weight of said oil, adding thereto approximately 40 to 80 parts by weight of pigment paste comprising two-thirds pigment and one-third conjugated double-bonded fatty oil by weight, and adding to the resulting mixture a solvent.

7. The method of making a wrinkle drying coating composition which consists of admixing at room temperature a conjugated double-bonded fatty oil with cellulose acetate in proportions of from 10 to 50 parts by weight of cellulose acetate to 100 parts by weight of said oil, adding thereto approximately 40 to 80 parts by weight of a pigment paste comprising two-thirds pigment and one-third conjugated double-bonded fatty oil by weight, and adding to the resulting mixture a solvent.

8. The method of making a wrinkle drying coating composition which consists of admixing at room temperature a conjugated double-bonded fatty oil with ethyl cellulose in proportions of from 10 to 50 parts by weight of ethyl cellulose to 100 parts by weight of said oil, adding thereto approximately 40 to 80 parts by weight of a pigment paste comprising two-thirds pigment and one-third conjugated double-bonded fatty oil by weight, and adding to the resulting mixture a solvent.

9. The method of making a wrinkle drying coating composition which consists of admixing at room temperature a conjugated double-bonded fatty oil with nitrocellulose in proportions of from 10 to 50 parts by weight of nitrocellulose to 100 parts by weight of said oil, adding thereto approximately 40 to 80 parts by weight of a pigment paste comprising two-thirds pigment and one-third conjugated double-bonded fatty oil by weight, and adding to the resulting mixture a solvent.

10. The method of making a wrinkle drying coating composition which consists of admixing at room temperature a conjugated double-bonded fatty oil with cellulose acetate having an acetyl value of 43-45 in proportions of from 10 to 50 parts by weight of acetate to 100 parts by weight of said oil, adding thereto approximately 40 to 80 parts by weight of a pigment paste comprising two-thirds pigment and one-third conjugated double-bonded fatty oil by weight, and adding to the resulting mixture a solvent.

NATHAN T. BEYNON.

REFERENCES CITED

The following references are of record in the file of this patent:

UNITED STATES PATENTS

| Number | Name | Date |
| --- | --- | --- |
| 695,127 | Thompson | Mar. 11, 1902 |
| 1,295,533 | Levey | Feb. 25, 1919 |
| 2,056,832 | Daniels | Oct. 6, 1936 |
| 2,099,570 | Murray | Nov. 16, 1937 |
| 2,219,263 | Okie | Oct. 22, 1940 |
| 2,271,804 | Root | Feb. 3, 1942 |
| 2,294,703 | Waldie | Sept. 1, 1942 |

OTHER REFERENCES

"Protective and Decorative Coatings," Matiello (1943).